United States Patent
Kuriyama et al.

(10) Patent No.: US 11,283,492 B2
(45) Date of Patent: Mar. 22, 2022

(54) WIRELESS COMMUNICATION SYSTEM, WIRELESS COMMUNICATION METHOD, TRANSMITTING STATION DEVICE AND RECEIVING STATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Masafumi Yoshioka, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/287,066

(22) PCT Filed: Oct. 18, 2019

(86) PCT No.: PCT/JP2019/041193
§ 371 (c)(1),
(2) Date: Apr. 20, 2021

(87) PCT Pub. No.: WO2020/085253
PCT Pub. Date: Apr. 30, 2020

(65) Prior Publication Data
US 2021/0359727 A1   Nov. 18, 2021

(30) Foreign Application Priority Data

Oct. 24, 2018   (JP) .............................. JP2018-200344

(51) Int. Cl.
*H04B 7/0417*   (2017.01)
*H04L 27/01*   (2006.01)
*H04L 25/03*   (2006.01)

(52) U.S. Cl.
CPC ..... *H04B 7/0417* (2013.01); *H04L 25/03343* (2013.01); *H04L 27/01* (2013.01);
(Continued)

(58) Field of Classification Search
CPC . H04B 7/0417; H04L 25/03343; H04L 27/01; H04L 2025/03426; H04L 2025/03808
See application file for complete search history.

(56) References Cited

U.S. PATENT DOCUMENTS

2003/0152159 A1   8/2003   Denno
2006/0274708 A1*  12/2006  Estraviz ................ H04L 1/0668
                                                         370/342
(Continued)

FOREIGN PATENT DOCUMENTS

JP   2003152607 A   5/2003

OTHER PUBLICATIONS

Shohei Yoshioka et al., Single-carrier multi-user MIMO downlink with time-domain Tomlinson-harashima precoding, IEICE Trans. Commun, vol. E99-B, 2016.
(Continued)

*Primary Examiner* — David S Huang

(57) ABSTRACT

According to the present invention, a transmitting station apparatus includes: a plurality of modulation units that modulates a plurality of streams into which transmission data is divided to generate a plurality of first data signals; a training signal generation unit that generates a known training signal; a linear equalization unit that linearly equalizes the plurality of first data signals using a tap coefficient for removing inter-antenna interference and inter-symbol interference and outputs second data signals on which transmission beam forming and equalization are simultaneously performed; and a plurality of transmitting station communication units that transmit the training signal or the second
(Continued)

data signals to a receiving station apparatus and receive the tap coefficient from the receiving station apparatus, and a receiving station apparatus includes: a coefficient estimation unit that estimates a channel impulse response from the training signal and calculates the tap coefficient based on the channel impulse response; and a receiving station communication unit that receives the second data signals or the training signal and transmits the tap coefficient calculated by the coefficient estimation unit to the transmitting station apparatus.

3 Claims, 10 Drawing Sheets

(52) U.S. Cl.
CPC ............... *H04L 2025/03426* (2013.01); *H04L 2025/03808* (2013.01)

(56) References Cited

U.S. PATENT DOCUMENTS

| | | | |
|---|---|---|---|
| 2010/0166098 A1* | 7/2010 | Luz ...................... | H04B 7/0413 375/267 |
| 2013/0052958 A1* | 2/2013 | Hasegawa ............ | H04B 7/0413 455/63.1 |
| 2013/0100914 A1* | 4/2013 | Nakamura ........... | H04B 7/0413 370/329 |
| 2016/0218781 A1* | 7/2016 | Seifert ................. | H04B 7/0456 |

OTHER PUBLICATIONS

Hayato Fukuzono et al., Subtraction of Reference Signals—Factors on Single-Carrier Block Multiuser MIMO Systems, IEICE 2018 Communication Society Conference Proceedings Proceedings 1, 2018, p. 387.

Shinya Kumagai and Fumiyuki Adachi, Joint Tx/Rx MMSE Filtering for Downlink Single-Carrier MU-MIMO, IEICE Technical Report, vol. 115, No. 233, 2015, pp. 101-106.

Shinya Kumagai and Fumiyuki Adachi, Joint Tx/Rx MMSE Filtering for Uplink Single-Carrier MU-MIMO, IEICE Technical Report, vol. 114, No. 395, 2015, pp. 181-186.

* cited by examiner

WIRELESS COMMUNICATION SYSTEM, WIRELESS COMMUNICATION METHOD, TRANSMITTING STATION DEVICE AND RECEIVING STATION DEVICE

CROSS-REFERENCE TO RELATED APPLICATIONS

This application is a 371 U.S. National Phase of International Application No. PCT/JP2019/041193 filed on Oct. 18, 2019, which claims priority to Japanese Application No. 2018-200344 filed on Oct. 24, 2018. The entire disclosures of the above applications are incorporated herein by reference.

TECHNICAL FIELD

The present invention relates to a technology for suppressing inter-antenna interference and inter-symbol interference in a wireless communication system that performs single-carrier multiple-input multiple-output (MIMO) transmission.

BACKGROUND ART

Broadband single-carrier MIMO transmission in a communication environment where frequency-selective fading occurs requires processing of suppressing inter-antenna interference (IAI) caused by a spatial extent of multiple antennas and inter-symbol interference (ISI) caused by a temporal extent of communication path characteristics. Here, by converting each MIMO-transmitted signal stream into blocks in the time direction, temporal and spatial information can be included in a channel impulse response (CIR) matrix indicating the communication path characteristics. Therefore, in the related art, a MIMO-transmitted signal with a cyclic prefix (CP) is converted into blocks and transmission beam forming is performed in units of blocks, thereby removing IAI and ISI (see Non Patent Literature 1, for example).

CITATION LIST

Non Patent Literature

Non Patent Literature 1: S. Yoshioka, S. Kumagai, and F. Adachi; "Single-carrier multi-user MIMO downlink with time-domain Tomlinson-harashima precoding," IEICE Trans. Commun., vol. E99-b, February 2016.

SUMMARY OF THE INVENTION

Technical Problem

However, according to the related art, a matrix operation is performed in units of blocks for transmission beam forming, and a part of data at the end of each block is copied and added as a CP to the head of each block. As a result, at the time of the matrix operation in the units of blocks and addition of the CP, there is a problem in that processing delays for a time corresponding to one block.

An object of the present invention is to provide a wireless communication system, a wireless communication method, a transmitting station apparatus, and a receiving station apparatus that can perform both of transmission beam forming and equalization to simultaneously remove IAI and ISI while suppressing a processing delay in single-carrier MIMO transmission.

Means for Solving the Problem

A first aspect of the invention is a wireless communication system configured to perform single-carrier MIMO transmission between a transmitting station apparatus and one or more receiving station apparatuses, wherein the transmitting station apparatus includes: a plurality of modulation units configured to modulate a plurality of streams into which transmission data is divided to generate a plurality of first data signals; a training signal generation unit configured to generate a known training signal; a linear equalization unit configured to linearly equalize the plurality of first data signals using a tap coefficient for removing inter-antenna interference and inter-symbol interference and to output a plurality of second data signals on which transmission beam forming and equalization are simultaneously performed; and a plurality of transmitting station communication units configured to transmit the training signal or the plurality of second data signals to each receiving station apparatus and receive the tap coefficient from each receiving station apparatus, and each receiving station apparatus includes: a coefficient estimation unit configured to estimate a channel impulse response from the training signal transmitted by the transmitting station apparatus and calculate, based on the channel impulse response, the tap coefficient used by the linear equalization unit of the transmitting station apparatus; and a receiving station communication unit configured to receive the plurality of second data signals or the training signal transmitted by the transmitting station apparatus and transmit the tap coefficient calculated by the coefficient estimation unit to the transmitting station apparatus.

A second aspect of the invention is a wireless communication system configured to perform single-carrier MIMO transmission between a transmitting station apparatus and one or more receiving station apparatuses, wherein the transmitting station apparatus includes: a plurality of modulation units configured to modulate a plurality of streams into which transmission data is divided to generate a plurality of first data signals; a training signal generation unit configured to generate a known training signal; a linear equalization unit configured to linearly equalize the plurality of first data signals using a tap coefficient for removing inter-antenna interference and inter-symbol interference and to output a plurality of second data signals on which transmission beam forming and equalization are simultaneously performed; a coefficient calculation unit configured to calculate the tap coefficient based on a channel impulse response received from each receiving station apparatus; and a plurality of transmitting station communication units configured to transmit the training signal or the plurality of second data signals to each receiving station apparatus and receive the channel impulse response from each receiving station apparatus, and each receiving station apparatus includes: an estimation unit configured to estimate the channel impulse response from the training signal transmitted by the transmitting station apparatus; and a receiving station communication unit configured to receive the plurality of second data signals or the training signal transmitted by the transmitting station apparatus and transmit the channel impulse response estimated by the estimation unit to the transmitting station apparatus.

A third aspect of the invention is a wireless communication method for a wireless communication system configured to perform single-carrier MIMO transmission between a transmitting station apparatus and one or more receiving station apparatuses, the method including: modulating, by the transmitting station apparatus, a plurality of streams into which transmission data is divided to generate a plurality of first data signals; generating, by the transmitting station apparatus, a known training signal; linearly equalizing, by the transmitting station apparatus, the plurality of first data signals using a tap coefficient for removing inter-antenna interference and inter-symbol interference and outputting a plurality of second data signals on which transmission beam forming and equalization are simultaneously performed; transmitting, by the transmitting station apparatus, the training signal or the plurality of second data signals to each receiving station apparatus and receiving the tap coefficient from each receiving station apparatus; estimating, by each receiving station apparatus, a channel impulse response from the training signal transmitted by the transmitting station apparatus and calculating, based on the channel impulse response, the tap coefficient used in the linearly equalizing by the transmitting station apparatus; and receiving, by each receiving station apparatus, the plurality of second data signals or the training signal transmitted by the transmitting station apparatus and transmitting the tap coefficient calculated in the estimating to the transmitting station apparatus.

A fourth aspect of the invention is a wireless communication method for a wireless communication system configured to perform single-carrier MIMO transmission between a transmitting station apparatus and one or more receiving station apparatuses, the method including: modulating, by the transmitting station apparatus, a plurality of streams into which transmission data is divided to generate a plurality of first data signals; generating, by the transmitting station apparatus, a known training signal; linearly equalizing, by the transmitting station apparatus, the plurality of first data signals using a tap coefficient for removing inter-antenna interference and inter-symbol interference and outputting a plurality of second data signals on which transmission beam forming and equalization are simultaneously performed; calculating, by the transmitting station apparatus, the tap coefficient based on a channel impulse response received from each receiving station apparatus; transmitting, by the transmitting station apparatus, the training signal or the plurality of second data signals to each receiving station apparatus and receiving the channel impulse response from each receiving station apparatus; estimating, by each receiving station apparatus, the channel impulse response from the training signal transmitted by the transmitting station apparatus; and receiving, by each receiving station apparatus, the plurality of second data signals or the training signal transmitted by the transmitting station apparatus and transmitting the channel impulse response estimated in the estimating to the transmitting station apparatus.

A fifth aspect of the invention is a transmitting station apparatus configured to perform single-carrier MIMO transmission to and from one or more receiving station apparatuses, the transmitting station apparatus including: a plurality of modulation units configured to modulate a plurality of streams into which transmission data is divided to generate a plurality of first data signals; a training signal generation unit configured to generate a known training signal; a linear equalization unit configured to linearly equalize the plurality of first data signals using a tap coefficient for removing inter-antenna interference and inter-symbol interference and to output a plurality of second data signals on which transmission beam forming and equalization are simultaneously performed; and a plurality of transmitting station communication units configured to transmit the training signal or the plurality of second data signals to each receiving station apparatus and receive the tap coefficient from each receiving station apparatus.

A sixth aspect of the invention is a transmitting station apparatus configured to perform single-carrier MIMO transmission to and from one or more receiving station apparatuses, the transmitting station apparatus including: a plurality of modulation units configured to modulate a plurality of streams into which transmission data is divided to generate a plurality of first data signals; a training signal generation unit configured to generate a known training signal; a linear equalization unit configured to linearly equalize the plurality of first data signals using a tap coefficient for removing inter-antenna interference and inter-symbol interference and to output a plurality of second data signals on which transmission beam forming and equalization are simultaneously performed; a coefficient calculation unit configured to calculate the tap coefficient based on a channel impulse response received from each receiving station apparatus; and a plurality of transmitting station communication units configured to transmit the training signal or the plurality of second data signals to each receiving station apparatus and receive the channel impulse response from each receiving station apparatus.

A seventh aspect of the invention is a receiving station apparatus configured to perform single-carrier MIMO transmission to and from a transmitting station apparatus, the receiving station apparatus including: a coefficient estimation unit configured to estimate a channel impulse response from a training signal transmitted by the transmitting station apparatus and calculate, based on the channel impulse response, a tap coefficient used by a linear equalization unit of the transmitting station apparatus; and a receiving station communication unit configured to receive a data signal or the training signal transmitted by the transmitting station apparatus and transmit the tap coefficient calculated by the coefficient estimation unit to the transmitting station apparatus.

An eighth aspect of the invention is a receiving station apparatus configured to perform single-carrier MIMO transmission to and from a transmitting station apparatus, the receiving station apparatus including: an estimation unit configured to estimate a channel impulse response from a training signal transmitted by the transmitting station apparatus; and a receiving station communication unit configured to receive a data signal or the training signal transmitted by the transmitting station apparatus and transmit the channel impulse response estimated by the estimation unit to the transmitting station apparatus.

Effects of the Invention

The wireless communication system, the wireless communication method, the transmitting station apparatus, and the receiving station apparatus according to the present invention can perform both of transmission beam forming and equalization to simultaneously remove IAI and ISI while suppressing a processing delay in single-carrier MIMO transmission.

DESCRIPTION OF EMBODIMENTS

Embodiments of a wireless communication system, a wireless communication method, a transmitting station apparatus, and a receiving station apparatus according to the present invention will be described with reference to the drawings.

Figure 1:
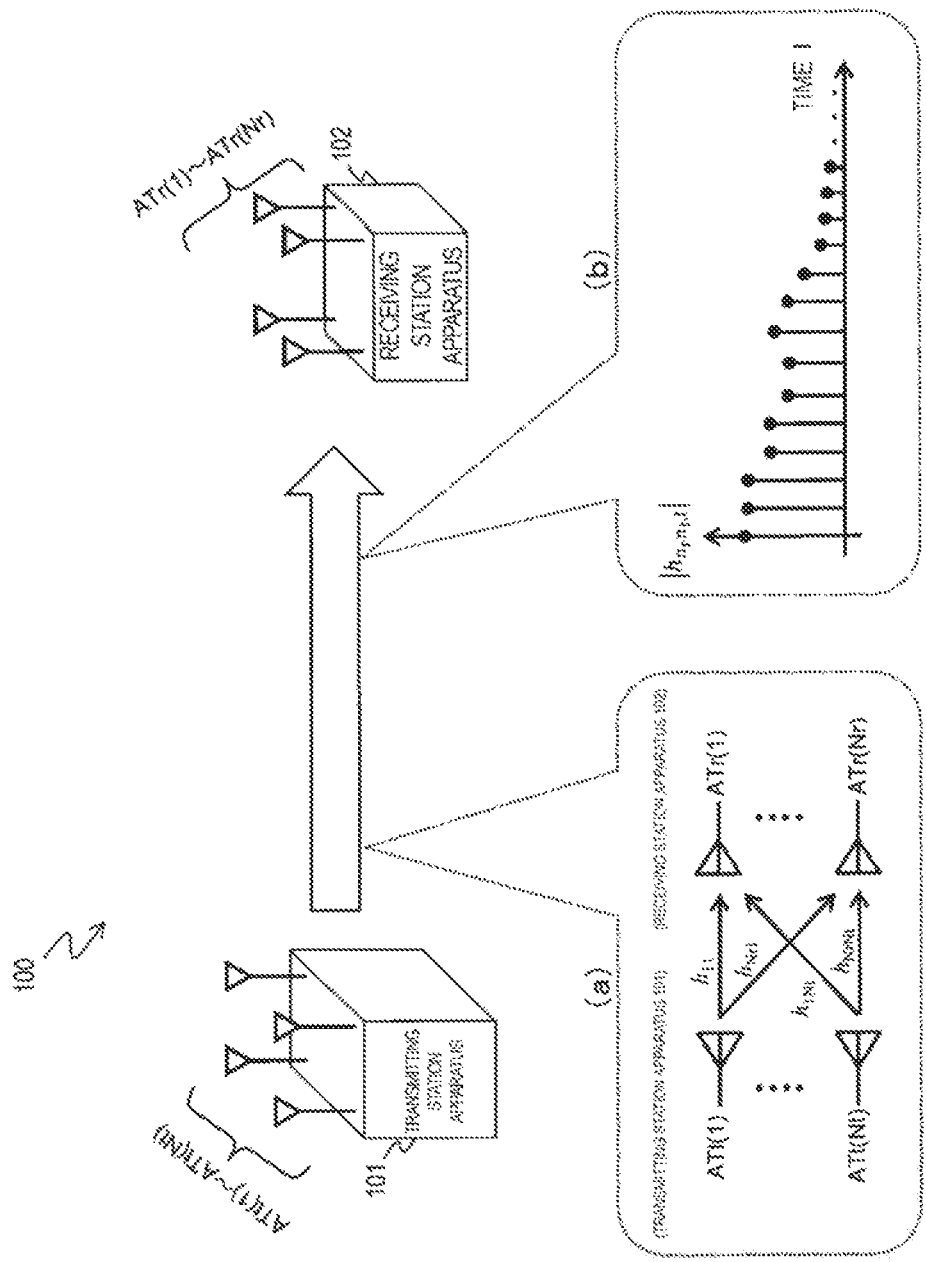
FIG. 1 is a diagram illustrating an example of a wireless communication system according to the present embodiment.

FIG. 1 is a diagram illustrating an example of a wireless communication system 100 according to the present embodiment. The wireless communication system 100 includes a transmitting station apparatus 101 including a plurality (Nt: Nt is an integer of two or more) of antennas of an antenna ATt(1) to an antenna ATt(Nt) and a receiving station apparatus 102 including a plurality (Nr: Nr is an integer of two or more) antennas of an antenna ATr(Nr) to an antenna ATr(1). In the present embodiment, a description will be given to the single-user MIMO wireless communication system 100 in which the single receiving station apparatus 102 includes the plurality of antennas ATr. However, the present invention can be also applied to a multi-user MIMO wireless communication system in which a plurality of receiving station apparatuses each include one or more antennas. Note that, in the following description, the antenna ATt(1) to the antenna ATt(Nt) of the transmitting station apparatus 101 each are referred to as "antenna ATt" with the numeral in parentheses at the end of the symbol omitted when a common description among these antennas is given. In contrast, when a specific antenna is described, the antenna is referred to as for example "antenna ATt(1)" with the numeral in parentheses added to the end of the symbol. The same also applies to the antenna ATr(1) to the antenna ATr(Nr) of the receiving station apparatus 102.

The wireless communication system 100 according to the present embodiment performs broadband single-carrier MIMO wireless communication using a plurality of antennas between the transmitting station apparatus 101 and the receiving station apparatus 102. A plurality of delay waves with different delay times, as in multipath propagation, are present between the transmitting station apparatus 101 and the receiving station apparatus 102, causing frequency-selective fading. For this reason, inter-antenna interference (IAI) and inter-symbol interference (ISI) caused by communication path characteristics need to be suppressed. For example, as illustrated in FIG. 1(a), inter-antenna interference (IAI) due to spatial extent occurs between the Nt antennas in the transmitting station apparatus 101 and the Nr antennas in the receiving station apparatus 102. In the example in FIG. 1(a), IAI occurs, which has components: $h_{11}$ between the antenna ATt(1) and the antenna ATr(1), $h_{Nr1}$ between the antenna ATt(1) and the antenna ATr(Nr), $h_{1Nt}$ between the antenna ATt(Nt) and the antenna ATr(1), and $h_{NrNt}$ between the antenna ATt(Nt) and the antenna ATr(Nr). As illustrated in FIG. 1(b), signals transmitted and received between the antennas of the transmitting station apparatus 101 and the antennas of the receiving station apparatus 102 are affected by inter-symbol interference (ISI) caused by temporal broadening. In the example in FIG. 1(b), the signals transmitted and received between the antenna ATt(nt) and the antenna ATr(nr) are affected by ISI having the component $h_{nmt,1}$ in the direction of time 1. Therefore, the wireless communication system 100 according to the present embodiment has a function of simultaneously performing equalization of inter-antenna interference (IAI) and equalization of inter-symbol interference (ISI) caused by communication path characteristics while suppressing a processing delay.

Figure 2:
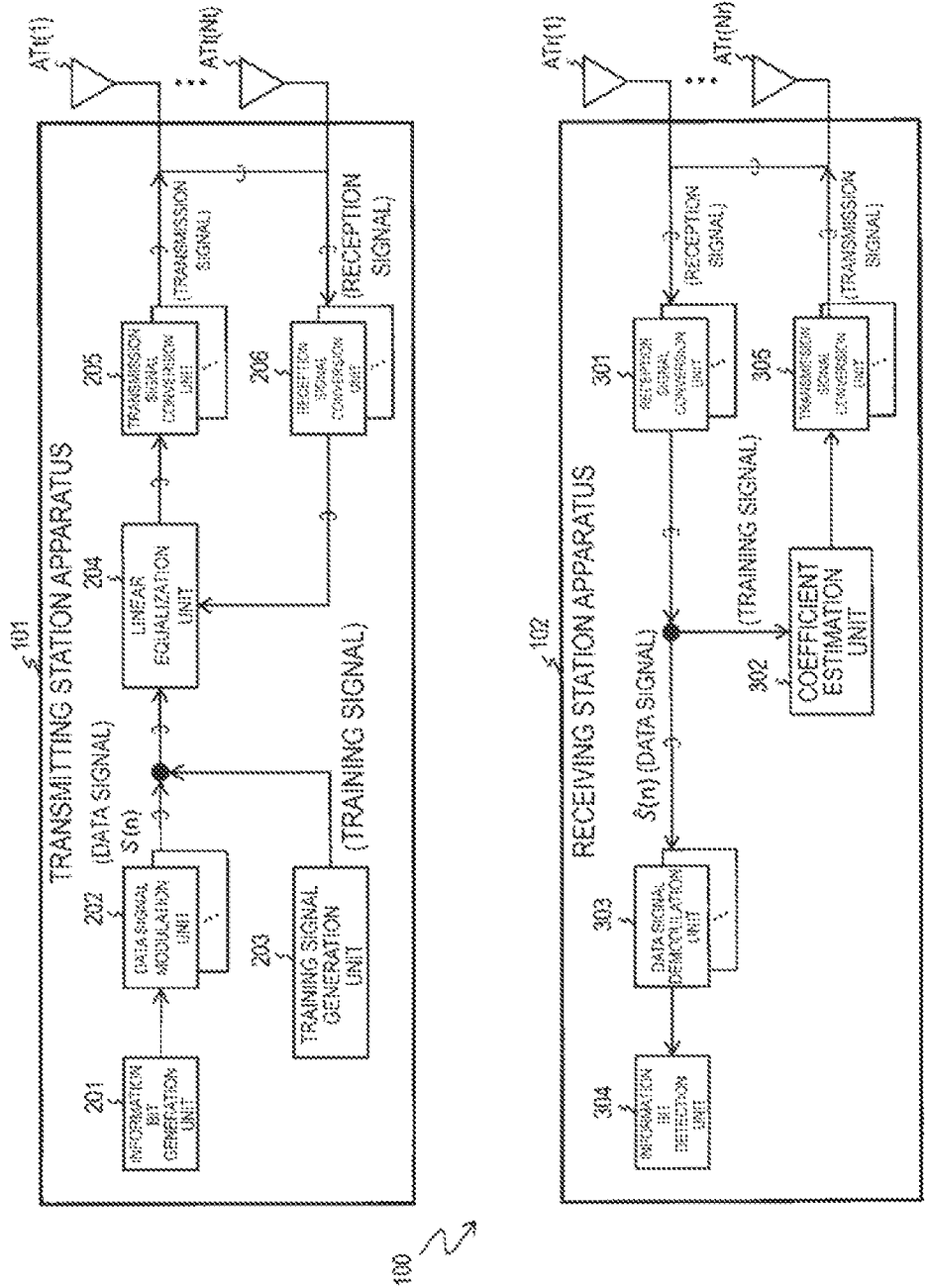
FIG. 2 is a diagram illustrating an example of a transmitting station apparatus and a receiving station apparatus according to the present embodiment.

FIG. 2 illustrates an example of the transmitting station apparatus 101 and the receiving station apparatus 102 according to the present embodiment. In FIG. 2, the transmitting station apparatus 101 includes an information bit generation unit 201, a data signal modulation unit 202, a training signal generation unit 203, a linear equalization unit 204, a transmission signal conversion unit 205, a reception signal conversion unit 206, and the Nt antennas of the antenna ATt(1) to the antenna ATt(Nt). In FIG. 2, the receiving station apparatus 102 includes the Nr antennas of the antenna ATr(1) to the antenna ATr(Nr), a reception signal conversion unit 301, a coefficient estimation unit 302, a data signal demodulation unit 303, an information bit detection unit 304, and a transmission signal conversion unit 305.

First, a configuration of the transmitting station apparatus 101 will be described.

The information bit generation unit 201 generates data information bits to be transmitted to the receiving station apparatus 102. The data information bits are a bit sequence corresponding to, for example, a data signal input from an outside (not illustrated), an internally generated data signal, or the like. Note that the information bit generation unit 201 may have an error correcting coding function of generating an error correcting code at a predetermined coding rate, an interleave function, and the like.

The data signal modulation unit 202 outputs a data signal S(n) acquired by modulating the bit sequence output by the information bit generation unit 201 in a predetermined modulation scheme (for example, quadrature amplitude modulation (QAM)). Note that in the present embodiment, the bit sequence output by the information bit generation unit 201 is divided into a plurality of streams according to the number of antennas ATt, and the data signal S(n) modulated for each stream is output. Thus, the data signal modulation unit 202 is provided for each stream.

The training signal generation unit 203 generates a training signal for estimating a channel impulse response (CIR). The training signal is a predetermined signal acquired by modulating predetermined information such as a preamble for signal detection (for example, a specific pattern such as an alternating pattern of "01") in a modulation scheme that is less susceptible to interference, such as phase shift keying (PSK). The training signal is used to estimate a CIR in the receiving station apparatus 102. Note that information on the training signal transmitted by the transmitting station apparatus 101 has been already known to the receiving station apparatus 102.

The linear equalization unit 204 is a transversal filter that has a delay tap holding the data signal output by the data signal modulation unit 202 and shifting the data signal every fixed time, and outputs a sum of signals acquired by multiplying respective delay tap signals by predetermined tap coefficients. The tap coefficient is a coefficient for removing IAI and ISI calculated based on the CIR estimated by the receiving station apparatus 102. The linear equalization unit 204 executes linear equalization for removing IAI and ISI to simultaneously perform transmission beam forming and equalization. Note that the linear equalization unit 204 outputs the training signal output by the training signal generation unit 203 as it is without performing linear equalization.

The transmission signal conversion unit 205 frequency-converts the data signal or the training signal output by the linear equalization unit 204 into a high-frequency transmission signal to be transmitted from the antenna ATt. For example, the transmission signal conversion unit 205 up-converts a data signal or a training signal in the 20 MHz band into a high-frequency signal in the 5 GHz band, and transmits the signal from the antenna ATt. The plurality of streams obtained by the division are converted into high-frequency signals, and are transmitted from respective antennas of the antenna ATt(1) to the antenna ATt(Nt).

The reception signal conversion unit 206 frequency-converts high-frequency reception signals received by the respective antennas of the antenna ATt(1) to the antenna ATt(Nt) into low-frequency baseband signals. For example, the reception signal conversion unit 206 down-converts a high-frequency signal in the 5 GHz band and outputs a baseband signal in the 20 MHz band. In the present embodiment, the reception signal conversion unit 206 receives a reception signal including information such as a tap coefficient and a CIR from the receiving station apparatus 102, converts the reception signal into a baseband signal, and outputs the baseband signal to the linear equalization unit 204. Note that a function of a demodulation unit that demodulates the information such as a tap coefficient from the baseband signal may be performed by the reception signal conversion unit 206 or the linear equalization unit 204.

In this manner, the transmitting station apparatus 101 can transmit a transmission signal with both of IAI and ISI removed to the receiving station apparatus 102.

Next, a configuration of the receiving station apparatus 102 illustrated in FIG. 2 will be described.

As illustrated in FIG. 1, the antennas ATr include the Nr transmission and reception antennas of the antenna ATr(1) to the antenna ATr(Nr) and emit high-frequency signals output by the transmission signal conversion unit 305 described later as electromagnetic waves to the space. Alternatively, the antennas ATr converts electromagnetic waves in the space transmitted from the transmitting station apparatus 101 into high-frequency signals.

Similar to the reception signal conversion unit 206 of the transmitting station apparatus 101, the reception signal conversion unit 301 frequency-converts high-frequency signals received by the antennas ATr into baseband signals. The reception signal conversion unit 301 outputs a training signal received from the transmitting station apparatus 101 to the coefficient estimation unit 302, and outputs a data signal S^(n) received from the transmitting station apparatus 101 to the data signal demodulation unit 303. The reception signal conversion unit 301 frequency-converts the high-frequency signal received from each of the antenna ATr(1) to the antenna ATr(Nr) to the baseband signal.

The coefficient estimation unit 302 estimates a CIR from the training signal transmitted from the transmitting station apparatus 101, and calculates a tap coefficient that the linear equalization unit 204 of the transmitting station apparatus 101 use to perform transmission beam forming and equalization for simultaneously removing IAI and ISI. Note that the coefficient estimation unit 302 may include a mechanism that calculates an error signal from the data signal without using the training signal and performs adaptive control. The coefficient estimation unit 302 may be provided in the transmitting station apparatus 101. In this case, the coefficient estimation unit 302 performs processing of estimating the CIR, transmits information on the estimated CIR to the transmitting station apparatus 101, and determines the tap coefficient in the transmitting station apparatus 101.

The data signal demodulation unit 303 demodulates the data signal S^(n) output by the reception signal conversion unit 301 to information bits, and outputs a bit sequence. Note that the reception signal conversion unit 301 outputs a plurality of streams of data signals S^(n) according to the number of antennas ATr, and the data signal demodulation unit 303 demodulates the data signal S^(n) for each stream. Then, the data signal demodulation unit 303 outputs, to the information bit detection unit 304, a bit sequence obtained by coupling bit sequences that have been divided into a plurality of streams in the transmitting station apparatus 101. Note that the data signal demodulation unit 306 may include an error correction decoding function or a de-interleave function according to the functions of the transmitting station apparatus 101.

The information bit detection unit 304 outputs reception data acquired by converting the bit sequence output by the data signal demodulation unit 303 into digital data. Note that the error correction decoding function and the de-interleave function may be performed in the information bit detection unit 304.

Similar to the transmission signal conversion unit 205 of the transmitting station apparatus 101, the transmission signal conversion unit 305 converts the information output by the coefficient estimation unit 302 into high-frequency signals, and transmits the high-frequency signals from the antennas ATt. For example, in the present embodiment, the CIR information and the tap coefficient information estimated by the coefficient estimation unit 302 are transmitted from the antennas ATt to the transmitting station apparatus 101. Note that the function of the modulation unit that modulates the tap coefficient information to a baseband signal may be included in the transmission signal conversion unit 305 or the coefficient estimation unit 302.

In this manner, the receiving station apparatus 102 can estimate the CIR from the training signal transmitted by the transmitting station apparatus 101, calculate the tap coefficient for simultaneously removing IAI and ISI based on the estimated CIR, and notify the tap coefficient to the transmitting station apparatus 101. As a result, the wireless communication system 100 can perform both of transmission beam forming and equalization to simultaneously remove IAI and ISI while suppressing a processing delay in single-carrier MIMO transmission.

Figure 3:
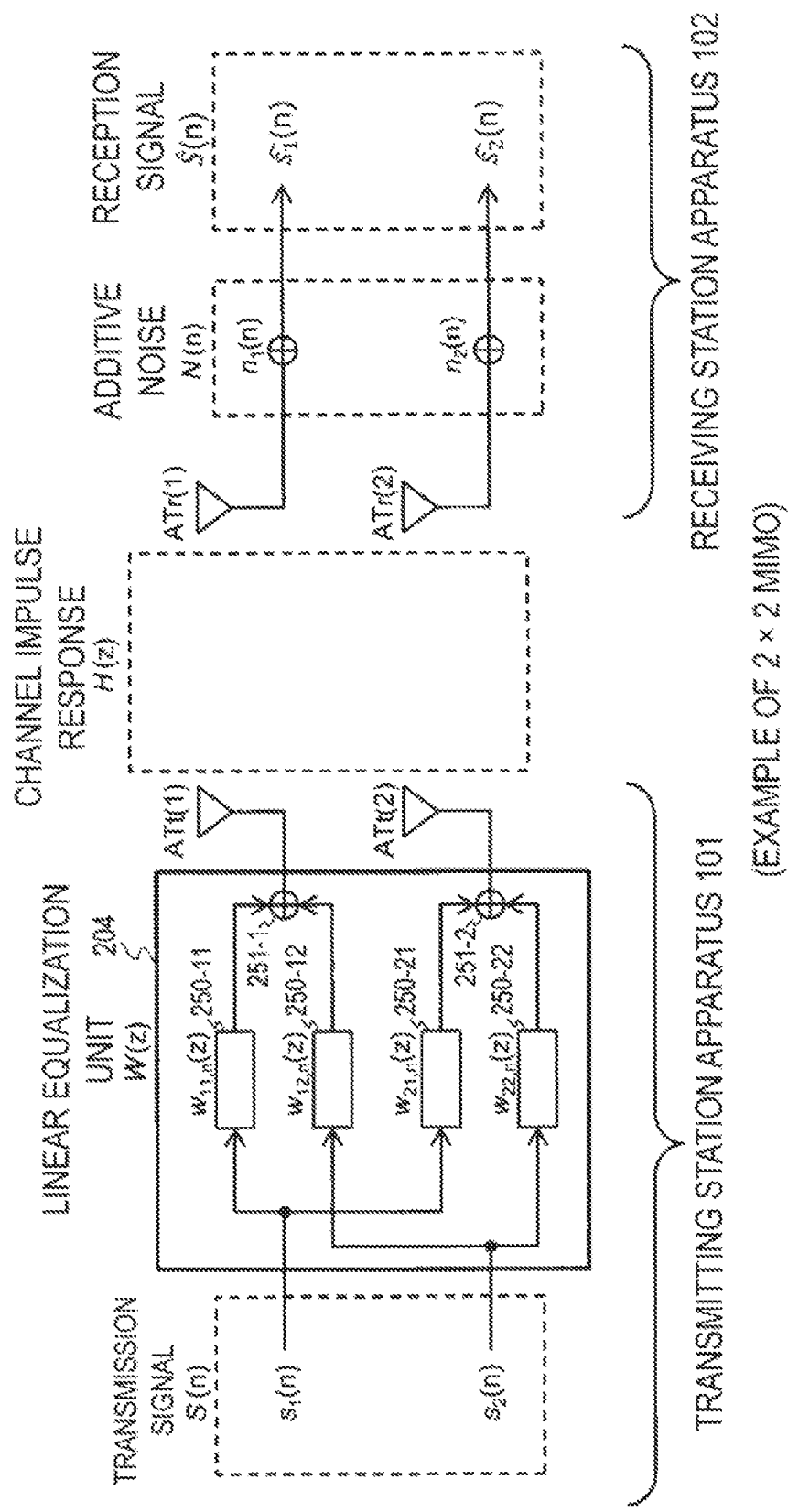
FIG. 3 is a diagram illustrating a signal flow in 2×2 MIMO.

FIG. 3 illustrates a signal flow in 2×2 MIMO. In FIG. 3, in the transmitting station apparatus 101, given that a transmission signal output by the data signal modulation unit

202 is S(n), two streams of a transmission signal $S_1(n)$ and a transmission signal $S_2(n)$ are transmitted.

The linear equalization unit 204 multiplies the transmission signal S(n) by a tap coefficient W(z) for simultaneously removing IAI and ISI. The linear equalization unit 204 includes four linear equalizers of a linear equalizer 250-11, a linear equalizer 250-12, a linear equalizer 250-21, and a linear equalizers 250-22. The linear equalizer 250-11 multiplies the transmission signal $S_1(n)$ by the tap coefficient $W_{11,n}(z)$, the linear equalizer 250-12 multiplies the transmission signal $S_2(n)$ by the tap coefficient $W_{12,n}(z)$, the linear equalizer 250-21 multiplies the transmission signal $S_1(n)$ by the tap coefficient $W_{21,n}(z)$, and the linear equalizer 250-22 multiplies the transmission signal $S_2(n)$ by the tap coefficient $W_{22,n}(z)$. The tap coefficient $W_{11,n}(z)$, the tap coefficient $W_{12,n}(z)$, the tap coefficient $W_{21,n}(z)$, and the tap coefficient $W_{22,n}(z)$ each have a coefficient obtained by adding one to the number of delay taps provided in the time axis direction. Then, a signal acquired by adding the signal multiplied by the tap coefficient $W_{11,n}(z)$ and the signal multiplied by the tap coefficient $W_{12,n}(z)$ are transmitted from the antenna ATt(1). Similarly, a signal acquired by adding the signal multiplied by the tap coefficient $W_{21,n}(z)$ and the signal multiplied by the tap coefficient $W_{22,n}(z)$ transmitted from the antenna ATt(2).

Wireless signals transmitted from the antenna ATt(1) and the antenna ATt(2) are received by the antenna ATr(1) and the antenna ATr(2) of the receiving station apparatus 102. The wireless signals are affected by frequency selective fading or the like in the communication path between the antenna ATt(1) and the antenna ATr(1) and the communication path between the antenna ATt(2) and the antenna ATr(2).

In the receiving station apparatus 102, reception signals S^(n) are acquired by adding additive noises N(n) caused by the reception circuit and the like to the signals received by the antenna ATr(1) and the antenna ATr(2). In the example in FIG. 3, an additive noise $n_1(n)$ and an additive noise $n_2(n)$ are added to the signal received by the antenna ATr(1) and the signal received by the antenna ATr(2), respectively, so that the reception signal $S_1\hat{}(n)$ and the reception signal $S2\hat{}(n)$ are acquired.

Given that the channel impulse response (CIR) is H(z), the tap coefficient is W(z), and the additive noise is N(n), the relationship between the transmission signal S(n) and the reception signal S^(n) can be expressed by an equation below.

[Math. 1]

$$\hat{S}(n) = H(z)W(z)S(n) + N(n) \quad (1)$$

In Equation (1), the channel impulse response H(z) is expressed by an equation below.

[Math. 2]

$$H(z) = \begin{bmatrix} h_{11}(z) & \cdots & h_{12}(z) \\ \vdots & \ddots & \vdots \\ h_{21}(z) & \cdots & h_{22}(z) \end{bmatrix} \quad (2)$$

[Math. 3]

$$\text{Here, } h_{i,j}(z) = \sum_{l=0}^{L-1} h_{ij,l} z^{-l} \quad (3)$$

(L is the number of delay waves)

In Equation (1), the tap coefficient W(z) is expressed by an equation below.

[Math. 4]

$$W(z) = \begin{bmatrix} w_{11}(z) & \cdots & w_{12}(z) \\ \vdots & \ddots & \vdots \\ w_{21}(z) & \cdots & w_{22}(z) \end{bmatrix} \quad (4)$$

[Math. 5]

$$\text{Here, } w_{ij}(z) = \sum_{n=0}^{N} w_{ij,n} z^{-n} \quad (5)$$

(N is the number of delay taps)

Next, an example of the tap coefficient W(z) in the linear equalization unit 204 in the case of the ZF (Zero Forcing) criterion will be described. A method of deriving a following equation will be described later.

[Math. 6]

$$W(z) = \frac{H^{-1}(z)}{\|H^{-1}(z)\|_F} \quad (6)$$

Here, $\| \|_F$ is Florbenius norm.

For the 2×2 MIMO illustrated in FIG. 3, the channel impulse response H(z) can be expressed by an equation below.

[Math. 7]

$$H(z) = \begin{bmatrix} h_{11}(z) & h_{12}(z) \\ h_{21}(z) & h_{22}(z) \end{bmatrix} \quad (7)$$

The inverse matrix of the channel impulse response H(z) can be expressed by an equation below.

[Math. 8]

$$H^{-1}(z) = \frac{1}{h_{11}(z)h_{22}(z) - h_{12}(z)h_{21}(z)} \begin{bmatrix} h_{22}(z) & -h_{12}(z) \\ -h_{21}(z) & h_{11}(z) \end{bmatrix} \quad (8)$$

Similarly, for Nr×Nt MIMO (Nr≤Nt), the channel impulse response H(z) can be expressed by an equation below.

[Math. 9]

$$H(z) = \sum_{l=0}^{L-1} z^{-l} H_l \quad (9)$$

Hi is expressed by a following expression according to the number of delay waves.

[Math. 10]

$$H_l = \begin{bmatrix} h_{11,l} & \cdots & h_{1N_t,l} \\ \vdots & \ddots & \vdots \\ h_{N_r1,l} & \cdots & h_{N_rN_t,l} \end{bmatrix} \quad (10)$$

The inverse matrix of the channel impulse response H(z) can be expressed by an equation below.

[Math. 11]

$$H^{-1}(z) \approx H^+(z) = \sum_{l=0}^{L-1} z^{-l} H_l^H (H_l H_l^H)^{-1} \quad (11)$$

Next, a method of deriving the tap coefficient W in the linear equalization unit 204 will be described.

In FIG. 3 described above, when the weight computation of the ZF criterion is performed, the additive noise N(n) is ignored and thus, the reception signal Ŝ is expressed by an equation below.

[Math. 12]

$$\hat{S} \approx HWS \approx S \quad (12)$$

Here, the tap coefficient W can be expressed as an equation below.

[Math. 13]

$$W = H^{-1} \approx H^+ = H^H(HH^H)^{-1} \quad (13)$$

($H^+$ is the pseudo-inverse matrix and $H^H$ is the Hermite transpose matrix)

At this time, a wireless signal $S_{RF}$ transmitted from the transmitting station apparatus 101 is expressed by an equation below.

[Math. 14]

$$S_{RF} = WS \quad (14)$$

$W_{norm}$ acquired by normalizing the tap coefficient W to make transmission power constant can be expressed as an equation below.

[Math. 15]

$$W_{norm} = \frac{H^{-1}}{\|H^{-1}\|_F} \quad (15)$$

In this manner, to simultaneously remove inter-antenna interference and inter-symbol interference, the wireless communication system 100 according to the present embodiment can calculate the tap coefficient W(z) to be set to the linear equalization unit 204.

Figure 4:
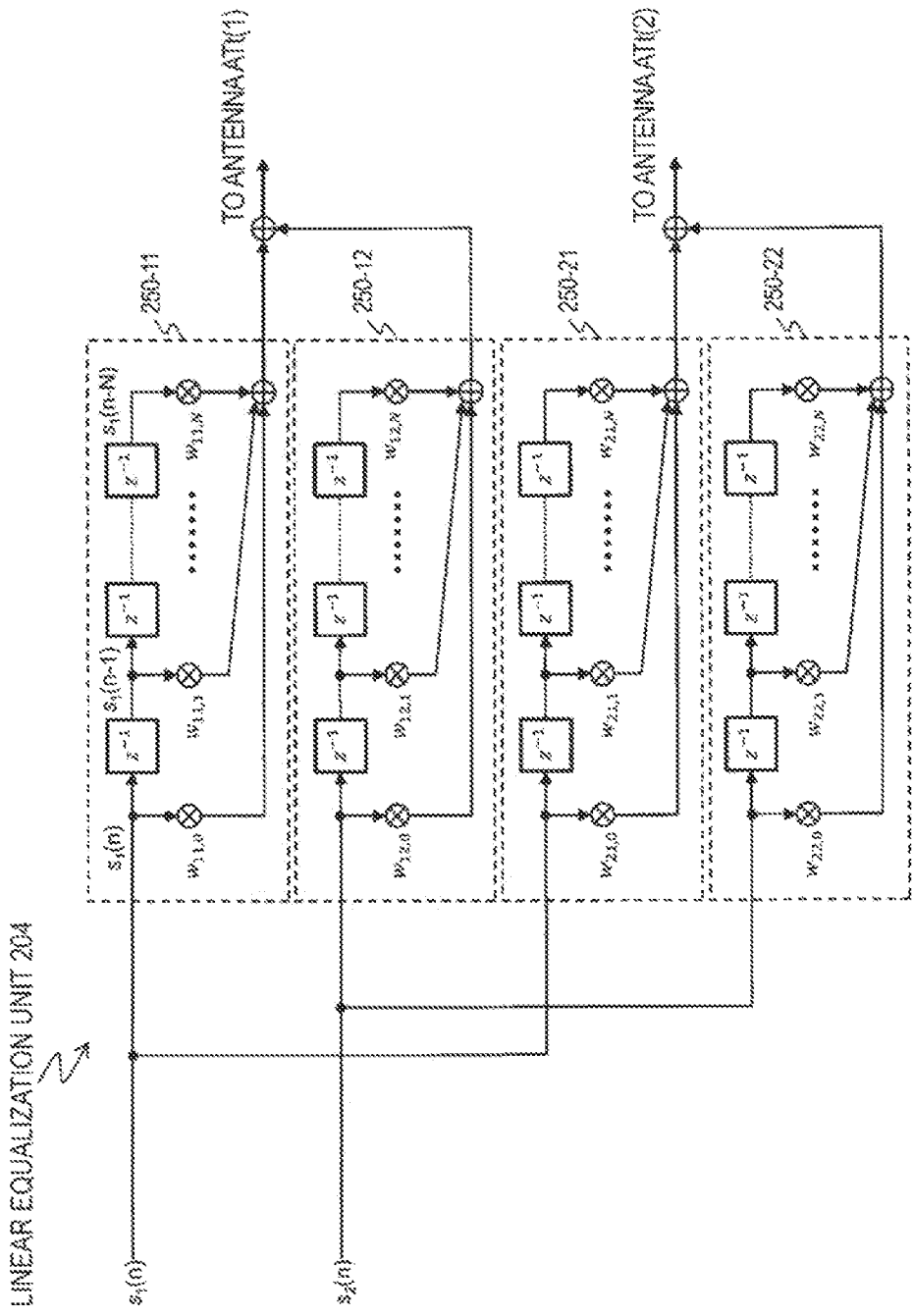
FIG. 4 is a diagram illustrating an example of a linear equalization unit according to the present embodiment.

FIG. 4 illustrates an example of the linear equalization unit 204 according to the present embodiment. Note that the linear equalization unit 204 illustrated in FIG. 4 corresponds to the 2×2 MIMO illustrated in FIG. 3. In FIG. 4, the linear equalizer 250-11 includes N (where N is a positive integer) delay taps $Z^{-1}$ and a signal is delayed for a predetermined time Td (for example, symbol interval) every time the signal passes through the delay tap $Z^{-1}$. Then, the input transmission signal $S_1(n)$ and the output signal of each delay tap $Z^{-1}$ are multiplied by the respective tap coefficients $w_{11,0}(z)$ to $w_{11,N}(z)$, and a sum of the multiplied values is output from the linear equalizer 250-11. Similarly, in the linear equalizer 250-12, the input transmission signal $S_2(n)$ and the output signal of each delay tap $Z^{-1}$ are multiplied by the respective tap coefficients $w_{12,0}(z)$ to $w_{12,N}(z)$, and a sum of the multiplied values is output from the linear equalizer 250-12. Then, the output signal from the linear equalizer 250-11 and the output signal from the linear equalizer 250-12 are added and transmitted from the antenna ATt(1). Note that in FIG. 4, the block of the transmission signal conversion unit 205 between the linear equalization unit 204 and the antenna ATt(1) illustrated in FIG. 1 is omitted.

Similarly, in FIG. 4, the linear equalizer 250-21 includes N delay taps $Z^{-1}$ and a signal is delayed for the predetermined time Td every time the signal passes through the delay tap $Z^{-1}$. Then, the input transmission signal $S_1(n)$ and the output signal of each delay tap $Z^{-1}$ are multiplied by the respective tap coefficients $w_{21,0}(z)$ to $w_{21,N}(z)$, and a sum of the multiplied values is output from the linear equalizer 250-21. Similarly, in the linear equalizer 250-22, the input transmission signal $S_2(n)$ and the output signal of each delay tap $Z^{-1}$ are multiplied by the respective tap coefficients $w_{22,0}(z)$ to $w_{22,N}(z)$, and a sum of the multiplied values is output from the linear equalizer 250-22. Then, the output signal from the linear equalizer 250-21 and the output signal from the linear equalizer 250-22 are added and transmitted from the antenna ATt(2). Note that in FIG. 4, the block of the transmission signal conversion unit 205 illustrated in FIG. 1 is omitted.

In this manner, the linear equalization unit 204 executes linear equalization on the transmission signal $S_1(n)$ and the transmission signal $S_2(n)$ using the tap coefficient W(z), thereby simultaneously removing IAI and ISI. Here, a delay time associated with the processing is obtained by multiplying the interval between the delay taps by the number of the delay taps. Note that the number N of delay taps is desirably set such that a delay time due to the N delay taps (N×Td) and a maximum delay time Tdmax in the communication path satisfy the relationship Tdmax≤(N×Td). The maximum delay time Tdmax in the communication path corresponds to a time length of the CP added to each block in the related art of executing processing in unit of blocks. In other words, the wireless communication system 100 according to the present embodiment can remove inter-antenna interference and inter-symbol interference with only the processing delay corresponding to about the time length of the CP in the related art.

Figure 5:
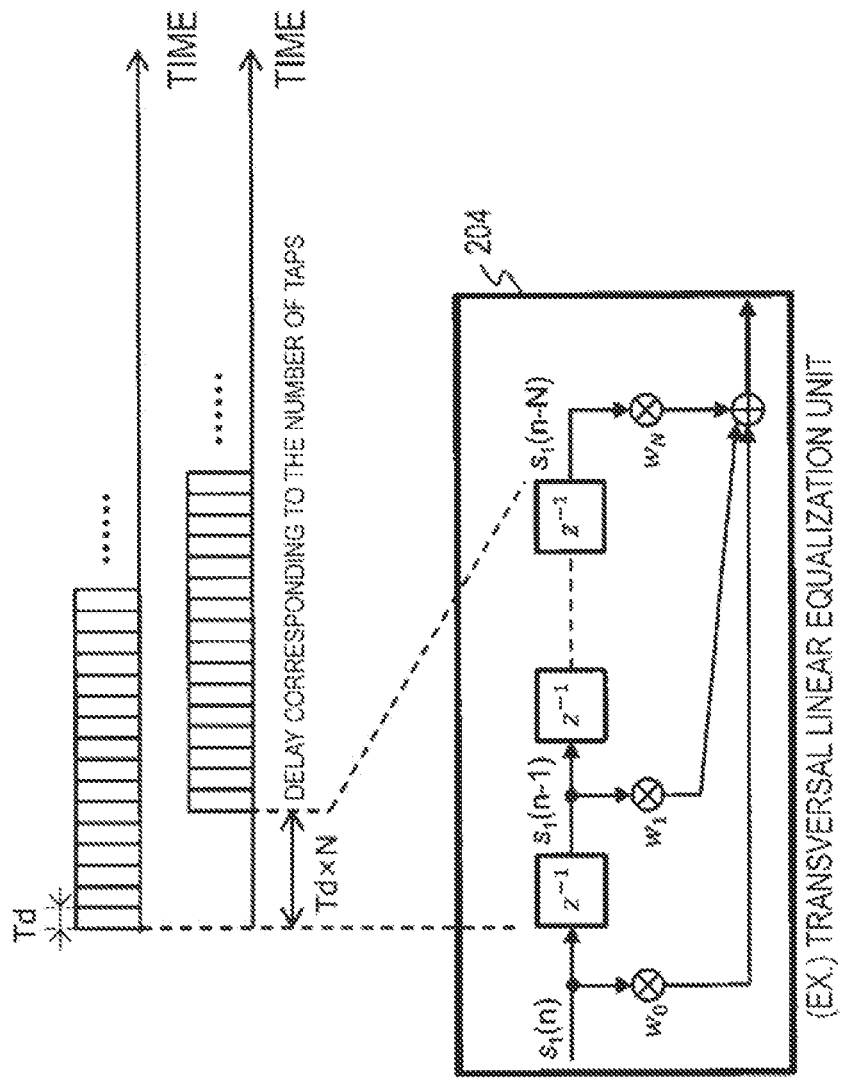
FIG. 5 is a diagram illustrating an example of a delay time in the wireless communication system according to the present embodiment.

FIG. 5 illustrates an example of a delay time of the wireless communication system 100 according to the present embodiment. In FIG. 5, the linear equalization unit 204 corresponds to any of the four linear equalizers of the linear equalizer 250-11 to the linear equalizer 250-22 in FIG. 4, and the input transmission signal $S_1(n)$ and the output signal of each delay tap $Z^{-1}$ are multiplied by the respective N tap coefficients (wo(z) to $w_N(z)$), and a sum of the multiplied values is output from the linear equalization unit 204. Here, given that the delay time of one tap is Td and the number of taps is N, the transmission signal $S_1(n)$ input to the linear equalization unit 204 is held by each delay tap $Z^{-1}$ and transferred to the next every Td time in a bucket brigade manner in the time axis direction. For example, the signal prior to the transmission signal $S_1(n)$ by one tap is $S_1(n-1)$, and the signal prior to the transmission signal $S_1(n)$ by N taps is $S_1(n-N)$. Thus, the delay time taken when the transmission signal $S_1(n)$ input to the linear equalization unit 204 passes through the N delay taps $Z^{-1}$ and is output from the linear equalization unit 204 is (Td×N).

Figure 6:
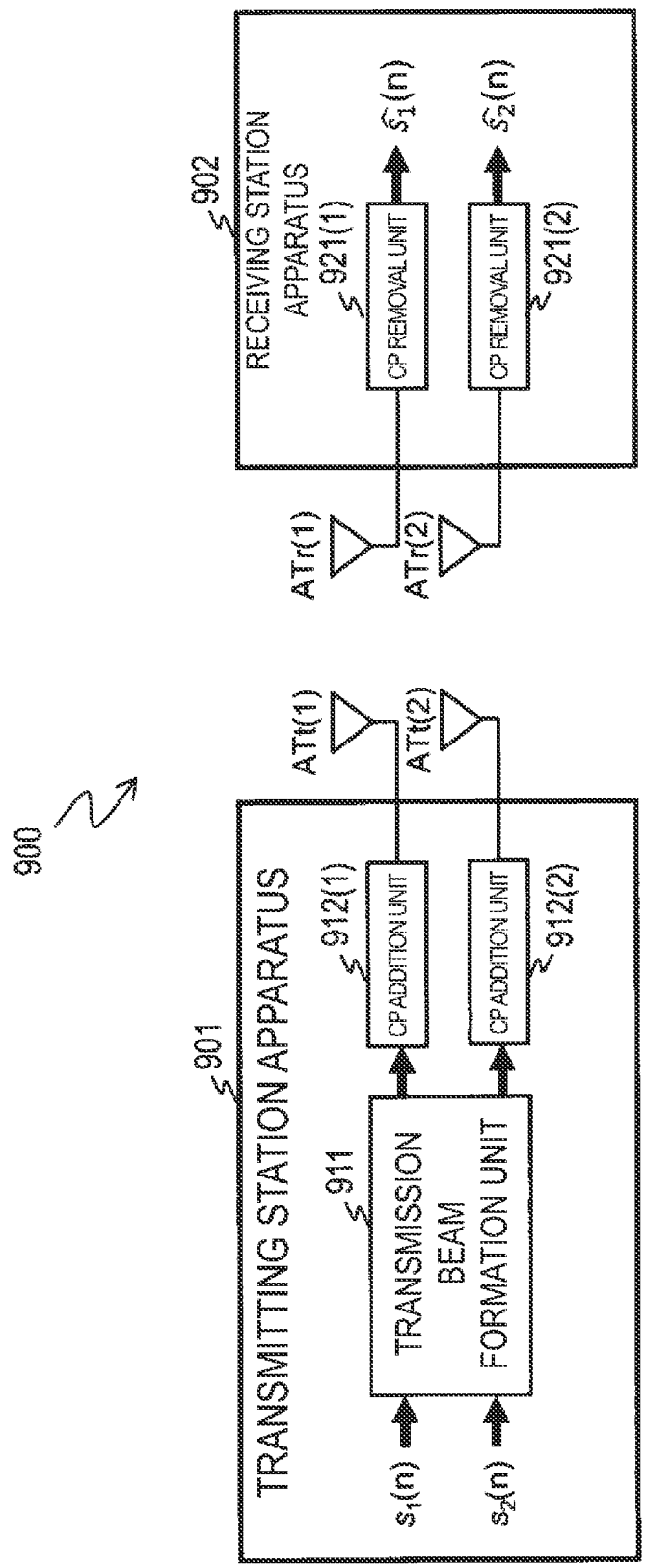
FIG. 6 is a diagram illustrating a wireless communication system in a comparative example.

FIG. 6 illustrates a wireless communication system 900 in a comparative example. The wireless communication system 900 includes a transmitting station apparatus 901 and a receiving station apparatus 902. The wireless communication system 900 in FIG. 6 is an example of 2×2 MIMO, and transmits two streams of a transmission signal $S_1(n)$ and a transmission signal $S_2(n)$.

In FIG. 6, the transmitting station apparatus 901 includes a transmission beam formation unit 911 that performs transmission beam forming on the transmission signal $S_1(n)$ and the transmission signal $S_2(n)$ to remove IAI and ISI, and a CP addition unit 912(1) and a CP addition unit 912(2) that add CP to converts signals output by the transmission beam formation unit 911 into blocks. The transmission signal to which the CP has been added by the CP addition unit 912(1) is transmitted from the antenna ATt(1), and the transmission signal to which the CP has been added in the CP addition unit 912(2) is transmitted from the antenna ATt(2). The receiving station apparatus 902 receives the wireless signals transmitted from the transmitting station apparatus 901 at the antenna ATr(1) and the antenna ATr(2). A CP removal unit 921(1) removes the CP from the signal received by the antenna ATr(1) and outputs a reception signal $S\hat{}_1(n)$. Similarly, a CP removal unit 921(2) removes the CP from the signal received by the antenna ATr(2) and outputs a reception signal $S\hat{}_2(n)$. In FIG. 6, the blocks such as the modulation unit, the demodulation unit, the transmission signal conversion unit, and the reception signal conversion unit are omitted.

Figure 7:
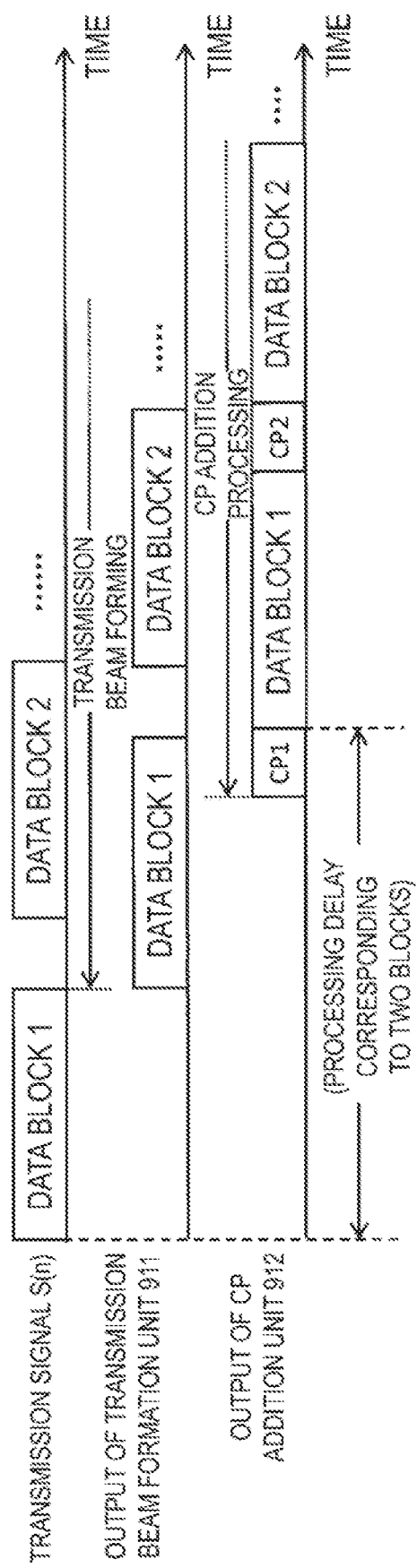
FIG. 7 is a diagram illustrating an example of a delay time in the wireless communication system in the comparative example.

FIG. 7 illustrates an example of a delay time in the wireless communication system 900 in the comparative example. FIG. 7 illustrates the transmission signal S(n) (the transmission signal $S_1(n)$ or the transmission signal $S_2(n)$) illustrated in FIG. 6, the output signal of the transmission beam formation unit 911, and the output signal of the CP addition unit 912 (the CP addition unit 912(1) or the CP addition unit 912(2)). The horizontal axis of FIG. 7 represents a time.

In FIG. 7, in the case of the transmission signal S(n) of the transmission beam formation unit 911, multiple pieces of symbol data are transmitted in units of blocks, such as a data block 1 and a data block 2. The transmission beam formation unit 911 executes processing of removing IAI and ISI to perform transmission beam forming in units of data blocks, and thus the output signal of the transmission beam formation unit 911 is delayed for a time corresponding to one block, compared with the transmission signal S(n). Furthermore, the CP addition unit 912 executes processing of copying a part of the end of the data block and adding the part to a head. As a result, the output signal of the CP addition unit 912 is delayed for a time corresponding to one block, compared with the output signal of the transmission beam formation unit 911. In the example in FIG. 7, the data block 1 and the data block 2 of the transmission signal S(n) are delayed for a time corresponding to one block and output in the transmission beam formation unit 911 and further delayed for a time corresponding to one block and output in the CP addition unit 912.

As described above, in the wireless communication system 900 in the comparative example, processing delays for a time corresponding to at least two blocks to remove IAI and ISI in units of blocks.

In contrast, in the wireless communication system 100 according to the present embodiment illustrated in FIG. 5, it is possible to remove IAI and ISI with only a processing delay corresponding to the number of delay taps, which is, for example, about the time of the CP in FIG. 7 (the time of the CP1 or CP2).

Processing Method of Wireless Communication System 100

Figure 8:
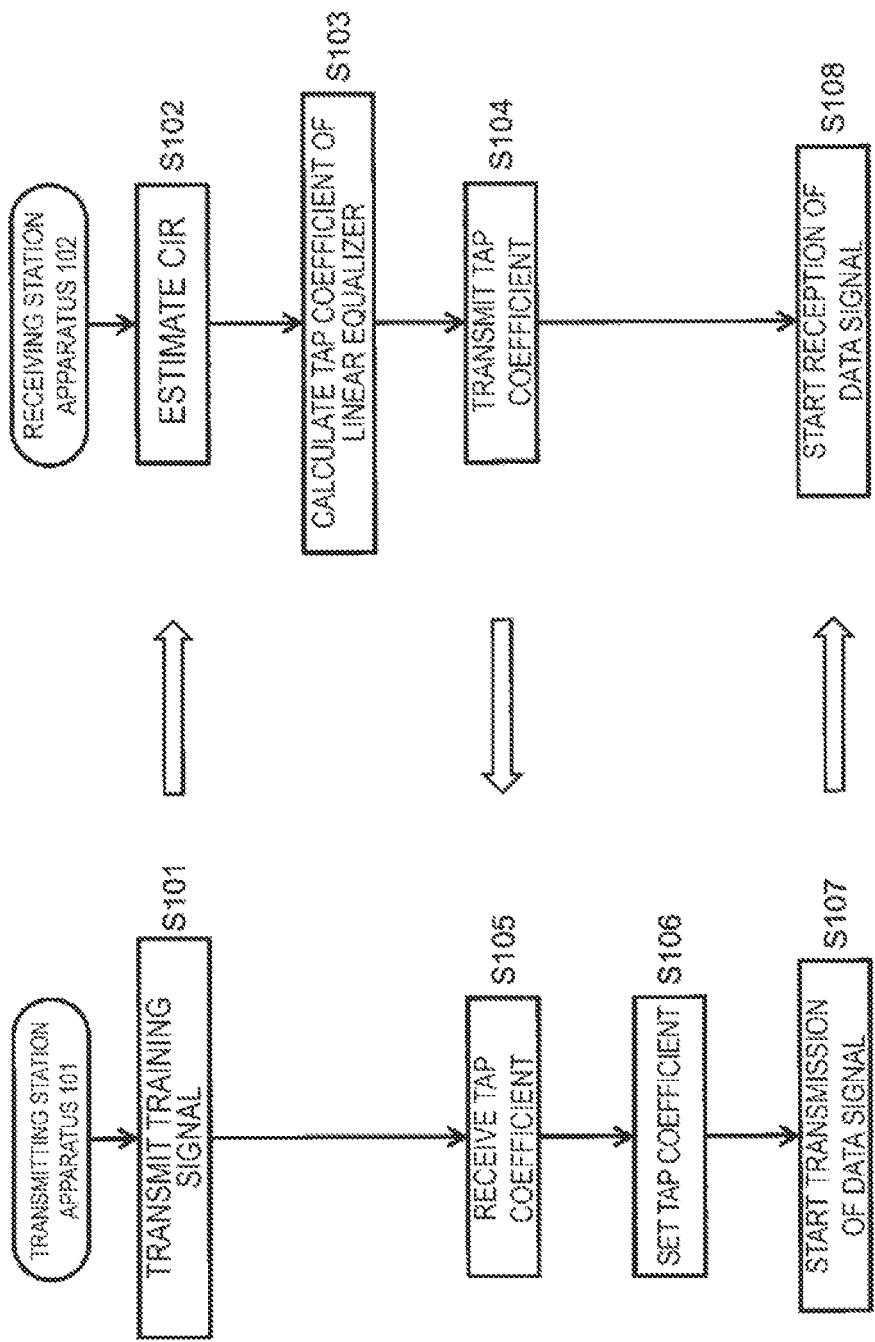
FIG. 8 is a diagram illustrating an example of processing of the wireless communication system according to the present embodiment.

FIG. 8 is a diagram illustrating an example of processing of the wireless communication system 100 according to the present embodiment. Note that the processing illustrated in FIG. 8 is executed by each unit of the transmitting station apparatus 101 and the receiving station apparatus 102 in FIG. 2.

Step S101: In the transmitting station apparatus 101, the training signal generation unit 203 generates a training signal for estimating a CIR, and the transmission signal conversion unit 205 transmits the training signal from the antenna ATt.

Step S102: In the receiving station apparatus 102, the coefficient estimation unit 302 receives the training signal transmitted in Step S101 and estimates a CIR.

Step S103: In the receiving station apparatus 102, the coefficient estimation unit 302 calculates a tap coefficient on the basis of the CIR estimated in Step S102.

Step S104: The receiving station apparatus 102 transmits the tap coefficient calculated in Step S103 to the transmitting station apparatus 101.

Step S105: The transmitting station apparatus 101 receives the tap coefficient transmitted from the receiving station apparatus 102 in Step S104.

Step S106: In the transmitting station apparatus 101, the linear equalization unit 204 sets the tap coefficient received in Step S105 to the linear equalization unit 204.

Step S107: In the transmitting station apparatus 101, the linear equalization unit 204 uses the tap coefficient set in Step S106 to start transmission of a data signal with IAI and ISI removed.

Step S108: The receiving station apparatus 102 starts reception of the data signal with IAI and ISI removed.

In this manner, the receiving station apparatus 102 can estimate the CIR from the training signal transmitted by the transmitting station apparatus 101, determine the tap coefficient for simultaneously removing IAI and ISI from the estimated CIR, and notify the tap coefficient to the transmitting station apparatus 101.

Other Embodiments

Figure 9:
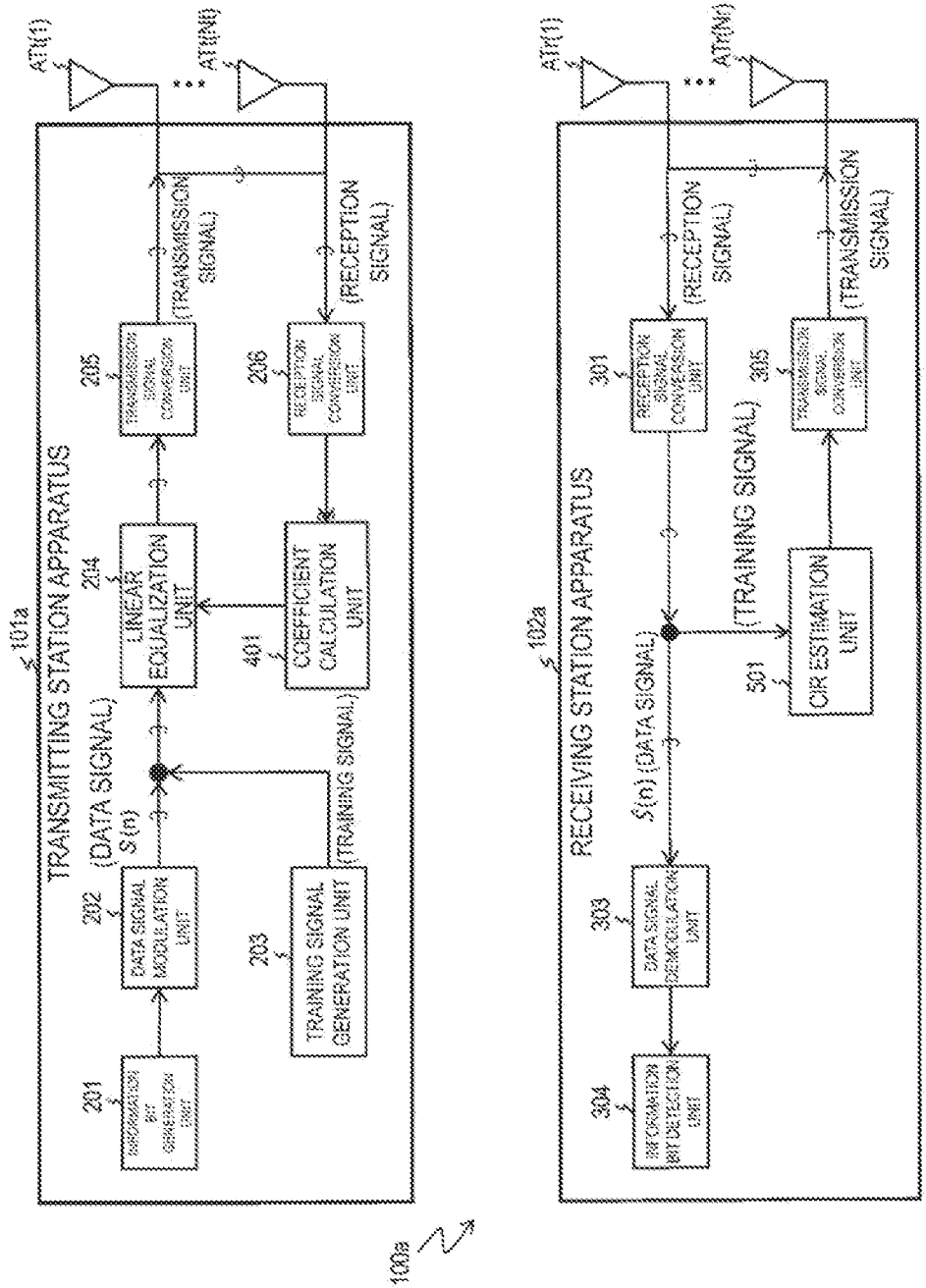
FIG. 9 is a diagram illustrating an example of a transmitting station apparatus and a receiving station apparatus according to another embodiment.

FIG. 9 illustrates an example of a transmitting station apparatus and a receiving station apparatus according to another embodiment. In FIG. 9, a wireless communication system 100*a* according to the present embodiment includes a transmitting station apparatus 101*a* and a receiving station apparatus 102*a*. The wireless communication system 100 illustrated in FIG. 2 and the wireless communication system 100*a* illustrated in FIG. 9 are different in that the processing of estimating the tap coefficient is performed in the transmitting station apparatus 101*a*, not in the receiving station apparatus 102*a*. Note that in FIG. 9, blocks having the reference signs identical to those in FIG. 2 execute the processing identical to the processing in FIG. 2. In FIG. 9, the transmitting station apparatus 101*a* includes a coefficient calculation unit 401 between the reception signal conversion unit 206 and the linear equalization unit 204. The receiving station apparatus 102*a* includes a CIR estimation unit 501 in place of the coefficient estimation unit 302 of the receiving station apparatus 102 in FIG. 2.

In FIG. 9, the CIR estimation unit 501 of the receiving station apparatus 102a receives a training signal transmitted from the transmitting station apparatus 101a, estimates a CIR, and transmits information on the CIR from the transmission signal conversion unit 305 and the antenna ATr.

The coefficient calculation unit 401 of the transmitting station apparatus 101a receives the information on the CIR transmitted from the receiving station apparatus 102a, calculates a tap coefficient used by the linear equalization unit 204, and sets the calculated tap coefficient in the linear equalization unit 204.

In this manner, similar to the wireless communication system 100 of the previous embodiment, the wireless communication system 100a according to the present embodiment can estimate the CIR from the training signal transmitted by the transmitting station apparatus 101, and determine the tap coefficient for simultaneously removing IAI and ISI based on the estimated CIR. As a result, the wireless communication system 100a can perform both of transmission beam forming and equalization to simultaneously remove IAI and ISI while suppressing a processing delay in single-carrier MIMO transmission.

Processing Method of Wireless Communication System 100a

Figure 10:
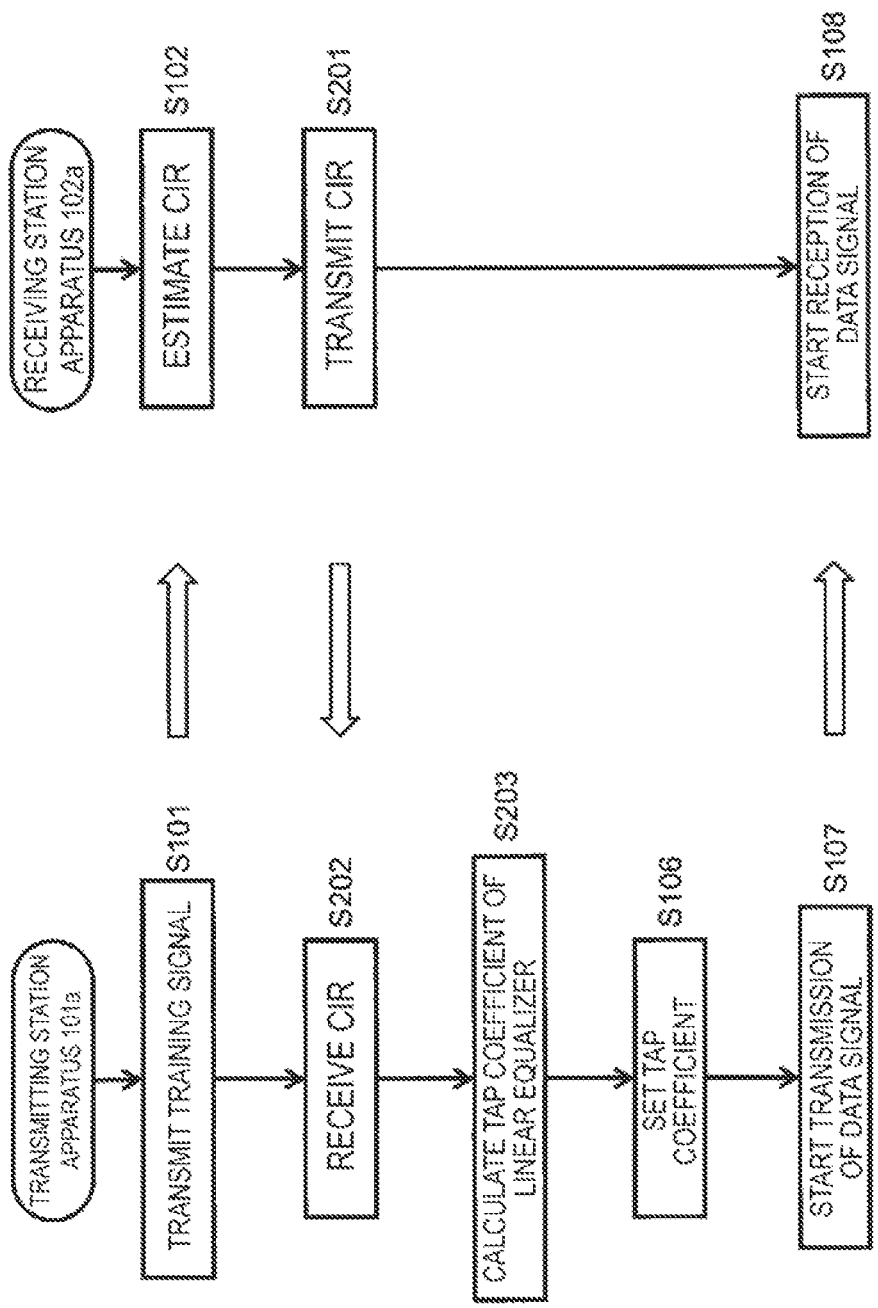
FIG. 10 is a diagram illustrating an example of processing of a wireless communication system according to the other embodiment.

FIG. 10 illustrates an example of processing of the wireless communication system 100a according to another embodiment. Note that the processing illustrated in FIG. 10 is executed by each unit of the transmitting station apparatus 101 and the receiving station apparatus 102 in FIG. 9. Note that in FIG. 10, steps having the reference signs identical to those in FIG. 8 described in the previous embodiment execute the processing identical to that in FIG. 8.

In Steps S101 and S102, the processing identical to that in FIG. 8 is executed, and the receiving station apparatus 102a receives a training signal transmitted from the transmitting station apparatus 101a and estimates a CIR.

Step S201: The receiving station apparatus 102a transmits the CIR estimated in Step S101 to the transmitting station apparatus 101a.

Step S202: The transmitting station apparatus 101a receives the CIR transmitted from the receiving station apparatus 102a in Step S201.

Step S203: In the transmitting station apparatus 101a, the coefficient calculation unit 401 calculates a tap coefficient on the basis of the CIR received in Step S202.

In Step S106 to Step S108, the processing identical to that in FIG. 8 is executed, and the transmitting station apparatus 101a sets the tap coefficient calculated in Step S203 in the linear equalization unit 204. Then, the transmitting station apparatus 101a starts transmission of a data signal with IAI and ISI removed, and the receiving station apparatus 102a starts reception of the data signal.

In this manner, the receiving station apparatus 102a can estimate the CIR from the training signal transmitted by the transmitting station apparatus 101a, and the transmitting station apparatus 101a can determine the tap coefficient for simultaneously removing IAI and ISI based on the estimated CIR and perform communication.

As described in each of the embodiments, the wireless communication system, the wireless communication method, the transmitting station apparatus, and the receiving station apparatus according to the present invention can perform both of transmission beam forming and equalization to simultaneously remove IAI and ISI while suppressing a processing delay in single-carrier MIMO transmission.

REFERENCE SIGNS LIST 100, 100a Wireless communication system
101, 101a Transmitting station apparatus
102, 102a Receiving station apparatus
201 Information bit generation unit
202 Data signal modulation unit
203 Training signal generation unit
204 Linear equalization unit
205 Transmission signal conversion unit
206 Reception signal conversion unit
ATt, ATr Antenna
301 Reception signal conversion unit
302 Coefficient estimation unit
303 Data signal demodulation unit
304 Information bit detection unit
305 Transmission signal conversion unit
401 Coefficient calculation unit
501 CIR estimation unit

The invention claimed is:

1. A wireless communication system configured to perform single-carrier MIMO transmission between a transmitting station apparatus and one or more receiving station apparatuses, wherein
the transmitting station apparatus includes:
a plurality of modulators configured to modulate a plurality of streams into which transmission data is divided to generate a plurality of first data signals;
a training signal generation unit configured to generate a known training signal;
a linear equalization unit configured to linearly equalize the plurality of first data signals using a tap coefficient for removing inter-antenna interference and inter-symbol interference and to output a plurality of second data signals on which transmission beam forming and equalization are simultaneously performed; and
a plurality of transmitting station communication units configured to transmit the training signal or the plurality of second data signals to each receiving station apparatus and receive the tap coefficient from each receiving station apparatus, and
each receiving station apparatus includes:
a coefficient estimation unit configured to estimate a channel impulse response from the training signal transmitted by the transmitting station apparatus and calculate, based on the channel impulse response, the tap coefficient used by the linear equalization unit of the transmitting station apparatus; and
a receiving station communication unit configured to receive the plurality of second data signals or the training signal transmitted by the transmitting station apparatus and transmit the tap coefficient calculated by the coefficient estimation unit to the transmitting station apparatus.

2. A wireless communication method for a wireless communication system configured to perform single-carrier MIMO transmission between a transmitting station apparatus and one or more receiving station apparatuses, the method comprising:
modulating, by the transmitting station apparatus, a plurality of streams into which transmission data is divided to generate a plurality of first data signals;
generating, by the transmitting station apparatus, a known training signal;
transmitting, by the transmitting station apparatus, the training signal to each receiving station apparatus;
estimating, by each receiving station apparatus, a channel impulse response from the training signal transmitted by the transmitting station apparatus;

calculating, by each receiving station apparatus, a tap coefficient based on the channel impulse response and transmitting the tap coefficient to the transmitting station apparatus;

linearly equalizing, by the transmitting station apparatus, the plurality of first data signals using a tap coefficient for removing inter-antenna interference and inter-symbol interference and outputting a plurality of second data signals on which transmission beam forming and equalization are simultaneously performed;

transmitting, by the transmitting station apparatus, the plurality of second data signals to each receiving station apparatus;

receiving, by each receiving station apparatus, the plurality of second data signals transmitted by the transmitting station apparatus.

3. A transmitting station apparatus configured to perform single-carrier MIMO transmission to and from one or more receiving station apparatuses, the transmitting station apparatus comprising:

a plurality of modulators configured to modulate a plurality of streams into which transmission data is divided to generate a plurality of first data signals;

a training signal generation unit configured to generate a known training signal;

a linear equalization unit configured to linearly equalize the plurality of first data signals using a tap coefficient for removing inter-antenna interference and inter-symbol interference and to output a plurality of second data signals on which transmission beam forming and equalization are simultaneously performed; and a plurality of transmitting station communication units configured to transmit the training signal or the plurality of second data signals to each receiving station apparatus and receive the tap coefficient from each receiving station apparatus.

* * * * *